United States Patent Office 2,861,880
Patented Nov. 25, 1958

2,861,880

ALUMINUM POWDER

John W. G. Hannon, Washington, Pa., assignor to McIntyre Research Foundation, Toronto, Ontario, Canada No Drawing. Original application November 18, 1954, Serial No. 469,821, now Patent No. 2,824,043, dated February 18, 1958. Divided and this application June 7, 1957, Serial No. 664,186

2 Claims. (Cl. 75—.5)

This invention relates to an improved powder for neutralizing the lung fibrosis-producing properties of finely pulverized siliceous materials. This application is a division of co-pending application Serial No. 469,821, filed November 18, 1954, now U. S. Patent No. 2,824,043.

It has been proposed in United States Patent No. 2,156,378 of May 2, 1939, granted to James J. Denny and Wilmot D. Robson that aluminum in the form of a powder preferably pure metallic aluminum be introduced into the lungs of persons subjected to the inhalation of silica particles to reduce the solubility of the silica particles in the lungs and thereby reduce their toxic or fibrosis-producing effect.

The patent discloses that if an aluminum powder in which the particle size is of the order of 5 to 10 microns or less is admixed with a siliceous material so that the aluminum powder constitutes approximately 1% of the mixture a reduction of from 75 to 90% in the solubility is effected.

While it has been found that the results set forth in the said patent were accurate from the standpoint of laboratory experiments and scientific knowledge, in practice it was observed that the expected degree of efficiency of reduction in the fibrosis-producing properties of the silica material was very considerably below that predicted due to uncontrollable variables in the powders and methods of application.

It was discovered that contrary to what was originally considered to be a toxic size of silica particle as suggested in the said Patent No. 2,156,378, say of the order of 10 microns, that in fact, much smaller silica particles, e. g. below 0.5 or 1 micron had a much higher degree of toxicity.

In addition it was discovered that the vulnerable lung phagocytic cells, the monocytes, were capable of engulfing large quantities of these smaller silica particles so that their combined surface area presented a greater surface area than the limited number of large silica particles which could be engulfed. Because of this larger surface area presented by the smaller silica particles more toxic products could be dissolved in greater concentrations to attack the engulfing or host cell.

Still a further factor was discovered in that the extremely fine silica particles could freely penetrate deeper into the lungs with little or no impingement on the walls of the upper and lower respiratory tract and at the angular bifurcations in the trachea, bronchial tubes, and bronchioles.

A great deal of work has been done in an effort to enable the production of an atmosphere containing aluminum powder which atmosphere will be completely and uniformly effective to counteract the effect of these fine silica particles. However, such work has been without avail until the present invention.

It is therefore the object of this invention to enable an aluminum powder containing atmosphere to be created which when inhaled will effectively protect against the poisoning of the lung cells by even the finest of silica particles to which the persons may be subjected.

Another important object is to enable such protective aluminum powder containing atmosphere to be consistently and economically created.

Again it is an important object to enable a large group of persons to be completely protected easily, quickly, and economically.

Another important object is to reduce the dosage and time of exposure required for protection of an individual from that previously required and at the same time to much more effectively protect the individual.

Still another object is to provide a novel powder of uniform characteristics which will consistently enable the production of the protective atmosphere as aforesaid.

Again it is an object to provide a powder which is highly resistant to settling out and gives a very slow settling rate so that it will remain in the atmosphere for long periods in a state ready to be inhaled and it may then be exhausted from the dispersal room following the treatment period before it has settled and caused any appreciable discoloration of the floor, walls, or ceiling of the room.

According to the present invention, therefore, persons exposed to dust conditions leading to silicosis are protected through the creation for their inhalation of an aluminum powder containing atmosphere, subject to uniform control, which will present the aluminum powder to the phagocytic cells or monocytes of the lungs in an active oxide form in which the powder particles will be many times more effective in their function of reducing the solubility of the silica than heretofore deemed possible.

Further according to the invention there is created an aluminum powder containing atmosphere as aforesaid in which the characteristics of the aluminum particle suspension will be such as to ensure that the persons exposed will quickly assimilate a sufficient quantity of the aluminum particles and that the aluminum particles will be of such a nature as to freely penetrate the lung structure without substantial impingement on the ciliated epithelium and into the air sacs, the point where the major damage due to fine silica particles occurs to thereby provide effective protection against silicosis.

More particularly I have discovered that if there is created an aluminum powder containing atmosphere which will consistently contain active aluminum particles having particular suspension characteristics hereinafter more fully specified and of such a size that in the suspended state the major quantity of the particles will be 0.4 micron or less and substantially all of which will be less than 1.2 microns, then simply exposing the workers for a few minutes will provide extremely effective protection against silicosis and moreover the toxic conditions of silicosis in the earlier stages will be abated.

Further, I have discovered that if the aluminum particles are projected into the atmosphere as aerosols they have an extended suspension life due to the enveloping electrostatically charged air envelopes, so that they are present in the atmosphere in greater concentrations for longer periods for inhalation. In addition it has been found that, by virtue of the positive electrostatic charge associated with the aluminum particle aerosols and the presence of a like positive electrostatic charge in the epithelium lining of the bronchial tubes, there is a repulsion of the aluminum particle and the resistance to impingement is increased ensuring that a high percentage of the inhaled aluminum particles actually penetrate into the alveolar sacs and into contact with the particular monocytes in which the silica particles are embedded.

I have further discovered that the atmosphere to have effective protective characteristics and at the same time be harmless must contain the aluminum powder not only in the form of a fine powder as aforesaid but as a powder comprising principally black aluminum oxide formed from pure metallic aluminum with the percentage of metallics limited to prevent the creation of an explosive atmosphere and yet at the same time to have a sufficiently high metallic content to provide a reservoir of metallic aluminum in the lungs of the persons exposed capable of combatting the effects of subsequently inhaled silica particles.

By this introduction of the aluminum into the lungs as aluminum oxide as opposed to metallic aluminum the particles are ready without the necessity of any oxidizing process to instantly react with the juices of the phagocytic cells and form aluminum hydroxide which is the form the aluminum must necessarily take in order to effect reduction of the silica solubility. Thus the powder is, on introduction into the lungs, in a state for immediate neutralization of the fibrosis-producing effects of the silica.

The invention will be more fully understood from the following detailed description.

Assuming that an individual is working in an atmosphere that is contaminated by silica particles in the toxic range of 1.0 micron or below and breathes through his nostrils the hairs in the nostrils filter out a certain percentage of dust. The tortuosity of the nasal spaces as well as the epithelium lining the nasal passages filters out another percentage of dust. As the air containing the silica dust passes down the throat to the larynx we find a constriction at the vocal cords, which filters out another percentage of dust. The air then passes down the trachea and out through the bronchial tubes where further dust is deposited on the cilia of the bronchial system as well as the bifurcations of the trachea and the bronchial tubes. Once the dust enters the air sacs of the lungs a portion is impinged on the lining of the air sacs and another protective mechanism comes into play.

In the lungs we have scavenger and phagocytic cells known as monocytes which are motile and which engulf the silica particles which they contact and transport them up through the bronchial system or through the lymphatics (the so-called sewers of the lungs). The monocytes which are 12 to 15 microns in diameter have considerable difficulty in engulfing more than than a few 5 to 10 micron particles but can engulf many 1 micron or smaller particles.

Once the silica is engulfed by the monocyte, the cellular fluids dissolve the silica to form silicic acid $$(SiO_2 \text{ plus } H_2O = H_2SiO_3)$$

It has been shown that the solubility of a given unit of silica is dependent almost entirely upon the surface area and as a result a given unit by weight of silica particles of, for instance, 1 micron would present some 10 times the surface area presented by the same unit by weight of 10 microns and as a result there would be some 10 times as much silicic acid and toxic products produced which would affect the health of the cell.

When the monocytes engulf a substantial quantity of small silica particles their toxic effect is sufficient to impair or destroy the motility of the monocyte to leave the air sacs causing a thickening of the air sac walls and thus impairing or destroying the normal oxygen-carbon dioxide exchange.

The ability to reduce the solubility of silica by the employment of an aluminum powder was clearly established in the said U. S. Patent and the laboratory experiments set out therein produced startling results.

In practice the results obtained with animals dusted with an aluminum powder containing atmosphere for extensive periods were also very good but the obvious problem of protecting humans in a similar manner by such extensive treatments was insurmountable.

In addition it was found, in practice, that the workmen exposed to silica were not as close to the source of the production of silica dust as were the experimented animals and their breathing zone was higher. As a result due to natural filtration phenomenon the workmen were exposed to dust atmospheres from which the larger particles had settled out and which consistently presented smaller and hence more toxic silica particles than the atmospheres to which the animals were exposed.

In addition the proposed method of dispersion by incorporating the aluminous material in a blasting charge was found unsuccessful for effective treatment since the persons to be treated were forced to retire to a point distant from the blast and during the initial period thereafter, the only intervals when the concentrations of the aluminous material were sufficient to be of value.

I have discovered that, if an aluminum powder of a specified fineness is introduced into the atmosphere under conditions hereinafter set out, and if the powder comprise an aluminum oxide formed from pure metallic aluminum, i. e. metallic aluminum having a purity of the order of 99.9%, and has a metallic aluminum content of approximately 12 to 15%, the breathing of such an atmosphere for only a few minutes will effectively protect the worker against and will counteract the effects of inhaled silica particles.

In order to produce such a protective atmosphere the fineness of the powder must be such that substantially all of the particles are of a size 1.2 microns or less and the majority of the particles are 0.4 micron or less.

While I perceived the possibilities of achieving improved results with a finer aluminum powder than that disclosed in the said patent, it has not heretofore been possible to manufacture such a powder. In co-pending application Serial No. 469,820, now U. S. Patent No. 2,837,451, there is described a method and apparatus for producing such a powder.

In order to create an atmosphere which will be effective to carry out the object of the invention it is necessary that the specific aluminum oxide with the predetermined metallic aluminum content be suspended in the air of a substantially closed chamber in a manner to have an extremely slow settling rate or characteristic whereby upon being introduced into the atmosphere in a concentration of approximately 1 gram per 1,000 cubic feet of atmosphere there will remain in suspension approximately 49,000 particles per cubic centimeter at an interval of eight minutes after introduction into said chamber.

I have found that if a powder of uniformly small sized aluminum oxide particles of the order of 1.2 microns or less is projected into the air at a high speed of the order of 45,000 feet per second or greater these particles can be separated in the air and such separated particles if blown into the air with sufficient velocity can be made to form individual aerosols in which the aluminum particle is surrounded by an envelope of air containing an electrostatic charge.

In the form of aerosols these fine aluminum particles are more buoyant due to the fact that they have a lower specific gravity by virtue of the surrounding air envelope. Additionally their Brownian movement assists them in staying in suspension.

Thus the result achieved by projecting the particles into the air at high velocities not only enables the inherent improvement in the suspension characteristics due to the fineness of the powder to be achieved, but additionally provides a very marked improvement through the creation of aerosols.

As aerosols the aluminum oxide particles have a further important advantage in that not only do they stay in the air longer in a state ready for inhalation, but by virtue of their charge and the fact that the cilia of the bronchial system bears a similar charge, the resistance of the fine particles to impingement on the cilia is naturally increased and a very large majority of the inhaled particles will penetrate into the alveolar sacs to be engulfed by silica containing monocytes.

Because of the fineness or small size of the aluminum particles together with their ability to enter the alveolar sacs in quantity, the monocytes can engulf sufficient small sized aluminum particles so that by virtue of the number and size they present an effective surface area to provide adequate electro-chemical activity to depress the solubility of any quantity of silica the monocyte is capable of engulfing.

By forming the powder as predominantly a specific aluminum oxide, I have found that the small aluminum particles on entering the monocyte are instantly converted to aluminum hydroxide by the cell juices to effect their neutralization of the toxic effects of the silica and do not depend on any supply of oxygen into the cell to render them active. Where aluminum as pure metallic aluminum particles is introduced into the lung cells these particles are inert until they first receive sufficient oxygen to be converted to aluminum oxide in order to react with the cell juices and attack the silica.

In order to achieve the desired dispersal characteristics and create the aluminum aerosol particles I have found that if the powder of the size as specified is sucked from a container by means of a Venturi type ejector employing compressed air having a line pressure of the order of 90 to 100 p. s. i. and an ejector nozzle of ⅛″ diameter to produce a nozzle velocity and hence initial particle velocity of approximately 45,000 to 48,000 feet per second, an effective protective atmosphere can be achieved using approximately .3 gram of powder to 1,000 cubic feet of relatively moisture-free air.

While I have discovered that through the employment of particular controls in the manufacture of aluminum oxide, as fully set out in the said co-pending application Serial No. 469,820, now Patent No. 2,837,451, enables the content of metallic aluminum in the powder to be accurately controlled, there is a distinct limitation on the permissible quantity of metallic aluminum that can be present in the powder without it constituting a combustible product. I have discovered that where the conditions of manufacture of an aluminum powder are such that an aluminum oxide is produced and the powder has a metallic aluminum content greater than approximately 15% the powder is unstable.

Also if the conditions are such as to produce a powder in which aluminum hydroxide is formed reducing the percentage of metallic aluminum present the powder is also unstable.

On the other hand I have discovered, as fully explained in the said co-pending application, that the manufacture of aluminum powder of the requisite fineness according to the present invention having a metallic content of substantially less than 10 to 12% is impractical, because of the "inefficiencies" of manufacture. Further, of course, as explained above, such lower metallic contents lack the metallic reservoir for an extended life of activity of the powder.

It will therefore be seen that the powder of the above described size must be presented in the atmosphere for optimum results as a powder comprising approximately 90 to 85% and preferably 88 to 86% aluminum oxide and having a metallic content of approximately 10 to 15% and preferably 12 to 14%.

Such a powder comprises a total aluminum content of approximately 60%, with the preferred powder varying from approximately 58.6% to 59.6% total aluminum.

In the application of the invention to eliminate silicosis from mines, foundries, ceramic plants, etc. wherein silica dust is present it has been found convenient to treat the workers for instance by exposing them to an aluminum powder containing atmosphere in the change houses or other restricted quarters.

Because of the uncertainty as to the amount of aluminum powder that would actually be inhaled by the men it was believed advisable to subject them frequently to atmospheres into which a substantial quantity of aluminum powder had been discharged. However, it was found that despite such precautions the effectiveness of the protection was variable in that no consistency in the actual number of aluminum powder particles in the air in a state capable of penetrating into the air sacs was obtainable.

It has been established, however, that if under the present invention an aluminum powder having a particle size in which substantially all particles are less than 1.2 microns and approximately 60% of which are 0.4 micron or less and containing a metallic aluminum content of approximately 13% is dispersed into a relatively dry atmosphere for instance in a change house by means of a high pressure air blast of the order of 90 to 100 p. s. i. and a nozzle velocity of the order of 48,000 feet per second and in a concentration of approximately 1 gram per 1,000 cu. ft. an atmosphere will be set up in which the concentration of aluminum oxide particles will be of the order of that set out in Tables 1 to 3 below. In these tables are compared the concentrations obtainable with the present invention and with the best atmosphere it is possible to produce with previous aluminum powders.

The powder of this atmosphere is capable of penetrating the air sacs of the lungs in effective concentrations even though the person being treated is subjected to the atmosphere for only a few minutes. I have discovered additionally through extensive tests that such aluminum powder particles provide a startling increase in the reduction of the solubility of the silica particles. Thus it is believed that the cumulative effect of the improved lung penetration together with the increased depression of the silica solubility provides a protection many times more effective than that previously achieved.

Where the application of the invention resides in the introduction of aluminum powder directly into the lungs of the workers, for instance directly from the source of powder production, a substantial concentration of aluminum oxide particles of a size less than 1.2 microns with the majority of 0.4 micron or less must be effected, and again such particles must have a percentage of metallic aluminum sufficient for reservoir purposes yet restricted for stability as aforesaid.

Such a powder of such a size has, in this application as well as the previously described application, a slow settling characteristic yet capable of lung penetration without substantial impingement, and additionally has the ability to produce the startling reduction in the solubility of the silica above described and as particularly set out in Table 4 below.

While I have described particular methods of introducing aluminum oxide of the requisite physical and chemical characteristics into the atmosphere in a manner to create a safe protective atmosphere in which the lungs of persons exposed are afforded full opportunity to assimilate the aluminum active principle in a state for optimum effects in neutralizing the toxicity of engulfed silica particles, it will be understood that other particular means of introducing an aluminum powder of the character aforesaid may be employed without departing from the spirit of the invention as set forth in the appended claims.

APPENDIX

*Table 1*

CONCENTRATION OF HM-38 AND D-R POWDERS AFTER DISPERSAL

| Time after Dispersal | Concentration, p. p. cc. | |
|---|---|---|
| | HM-38 [1] | D-R [2] |
| 8 Min | 49,300 | 16,000 |
| 30 Min | 38,600 | 10,700 |
| 60 Min | 28,100 | 6,200 |

[1] See footnote, Table 3.
[2] See footnote, Table 3.

*Table 2*

SIZE DISTRIBUTION OF HM-38 AND D-R POWDERS 8 MINUTES AFTER DISPERSAL

| Size Group Mean Diameter ($\mu$) | Percentage Occurrence | | Percentage up to Max. Size of Group | |
|---|---|---|---|---|
| | HM-38 [1] | D-R [2] | HM-38 | D-R |
| Up to 0.2 | 24.60 | 2.69 | 24.60 | 2.69 |
| 0.2 to 0.4 | 30.85 | 5.83 | 55.45 | 8.52 |
| 0.4 to 0.8 | 32.58 | 20.18 | 88.03 | 28.70 |
| 0.8 to 1.2 | 8.64 | 19.73 | 96.67 | 48.43 |
| 1.2 to 1.6 | 1.72 | 17.04 | 98.39 | 65.47 |
| 1.6 to 2.0 | 0.79 | 16.14 | 99.18 | 81.61 |
| Above 2.0 | 0.82 | | | |
| 2.0 to 2.5 | | 4.48 | | 86.09 |
| 2.5 to 3.0 | | 2.24 | | 88.33 |
| 3.0 to 4.0 | | 3.58 | | 91.91 |
| 4.0 to 5.0 | | 2.69 | | 94.60 |
| Above 5.0 | | 5.40 | | |

[1] See footnote, Table 3.
[2] See footnote, Table 3.

*Table 3*

SIZE DISTRIBUTION OF HM-38 AND D-R POWDERS 60 MINUTES AFTER DISPERSAL

| Size Group Mean Diameter ($\mu$) | Percentage Occurrence | | Percentage up to Max. Size of Group | |
|---|---|---|---|---|
| | HM-38 [1] | D-R [2] | HM-38 | D-R |
| Up to 0.2 | 23.36 | 17.11 | 23.36 | 17.11 |
| 0.2 to 0.4 | 37.35 | 29.60 | 60.71 | 46.71 |
| 0.4 to 0.8 | 28.41 | 19.73 | 89.12 | 66.44 |
| 0.8 to 1.2 | 8.23 | 11.84 | 97.35 | 78.28 |
| 1.2 to 1.6 | 1.77 | 6.57 | 99.12 | 84.85 |
| 1.6 to 2.0 | 0.44 | 6.57 | 99.76 | 91.42 |
| Above 2.0 | 0.44 | | | |
| 2.0 to 2.5 | | 3.29 | | 94.71 |
| 2.5 to 3.0 | | 3.29 | | 98.00 |
| 3.0 to 4.0 | | 1.31 | | 99.31 |
| 4.0 to 5.0 | | 0.69 | | 100.0 |
| Above 5.0 | | | | |

[1] HM-38 represents the atmosphere produced by the specified aluminum powder in accordance with the present invention.
[2] D-R represents the optimum atmosphere produced under same conditions as HM-38 but using optimum powder available prior to the present invention.

*Table 4*

SOLUBILITY TABLE

| Sample | Grams | $H_2O$, cc. | Aluminum | P. p. m. Silica | Red., Percent |
|---|---|---|---|---|---|
| Sample I: | | | | | |
| McIntyre Mines Quartz | 1.0 | 100 | 0 | 33.2 | |
| Do | 1.0 | 100 | 10 mg. D-R [1] | 1.1 | 96 |
| Sample II: | | | | | |
| McIntyre Mines Quartz | 1.0 | 100 | 0 | 50.4 | |
| Do | 1.0 | 100 | 3 mg. HM-38 [2] | 3.5 | 93.1 |
| Do | 1.0 | 100 | 2 mg. HM-38 | 5 | 90.2 |
| Do | 1.0 | 100 | 1 mg. HM-38 | 8 | 84.1 |
| Sample III: | | | | | |
| Montreal Silica | 1.0 | 100 | 0 | 4.4 | |
| Do | 1.0 | 100 | 10 mg. D-R | 1.2 | 72.0 |
| Sample IV: | | | | | |
| Montreal Silica | 1.0 | 100 | 0 | 12.5 | |
| Do | 1.0 | 100 | 1 mg. HM-38 | 3.1 | 74.9 |
| Sample V: | | | | | |
| Montreal Silica | 1.0 | 100 | 0 | 16.1 | |
| Do | 1.0 | 100 | 1 mg. HM-38 | 4.1 | 74.2 |
| Sample VI: | | | | | |
| Flint | 1.0 | 100 | 0 | 76.7 | |
| Do | 1.0 | 100 | 3 mg. HM-38 | 8.1 | 89.4 |
| Sample VII: | | | | | |
| Flint | 1.0 | 100 | 0 | 71.7 | |
| Do | 1.0 | 100 | 1 mg. HM-38 | 12.1 | 83.1 |
| Sample VIII: | | | | | |
| Diatomaceous earth | 1.0 | 100 | 0 | 23.4 | |
| Do | 1.0 | 100 | 1 mg. HM-38 | 6.72 | 71.91 |

[1] D-R represents best powder previously available.
[2] HM-38 represents the powder used to create a protective atmosphere in accordance with the present invention.

What I claim as my invention is:

1. A powder for use in the prevention of silicosis comprising a stable aluminum oxide powder formed from substantially pure metallic aluminum and having a particle size such that substantially all of the particles are 1.2 microns or less and the majority of the particles are 0.4 micron or less, said particles containing 12 to 15% pure metallic aluminum.

2. A stable aluminum oxide powder formed from substantially pure metallic aluminum for use in the prevention of silicosis, said powder comprising particles in the form of nuclei of metallic aluminum with surrounding oxide coatings, substantially all of said particles having a mean diameter of 1.2 microns or less and the majority of said particles having a mean diameter of 0.4 micron or less, and said metallic aluminum nuclei comprising 12 to 15% of the powder.

References Cited in the file of this patent

UNITED STATES PATENTS 2,678,879   Nuesch et al. _____ May 18, 1954

FOREIGN PATENTS 625,364   Great Britain _____ June 27, 1949